United States Patent [19]

Boden

[11] Patent Number: 5,633,686

[45] Date of Patent: May 27, 1997

[54] ADAPTIVE DIGITAL VIDEO SYSTEM

[76] Inventor: Scott T. Boden, 405 Coachwood, El Cajon, Calif. 92019

[21] Appl. No.: 305,906

[22] Filed: Sep. 14, 1994

[51] Int. Cl.$^6$ ........................................................ H04N 7/01
[52] U.S. Cl. .................................... 348/441; 348/469
[58] Field of Search ................................. 348/441, 469, 348/426, 500, 571, 384, 385, 387; H04N 7/01, 7/12

[56] References Cited

U.S. PATENT DOCUMENTS

| | | | |
|---|---|---|---|
| 5,289,276 | 2/1994 | Siracusa et al. | 348/426 |
| 5,444,491 | 8/1995 | Lim | 348/441 |

*Primary Examiner*—Victor R. Kostak

[57] ABSTRACT

In an adaptive digital video system, a decoder at a receiving station for a digitally encoded video signal is able to automatically adapt to varying formats and operating modes. All digital video parameters and system operational commands are encoded inband with the digital video serial data stream. The video data is transmitted in successive blocks (e.g., typically an entire image frame or portions thereof) along with system data bytes and control bytes. The data bytes represent the parameters and commands required by the receiver decoder to adapt to the transmitter encoder settings. The control bytes identify the particular parameters and commands represented by respective data bytes. The method is independent of the particular video format or encoding scheme employed, and functions with any transmission medium and bandwidth.

17 Claims, 10 Drawing Sheets

ADAPTIVE DIGITAL VIDEO SYSTEM

BACKGROUND OF THE INVENTION

1. Technical Field

The present invention relates to digital video signal encoding for transmission and, more particularly, to an adaptive encoding scheme that is independent of the video data format, the nature and bandwidth of the transmission medium, and the bit transmission rate.

2. Discussion of the Prior Art

In certain types of digital video signal transmission systems, the parameters of the digital video signal that is received at a particular location are subject to change. For example, in aerial surveillance systems, video cameras on one or more aircraft may require changes in an operating parameter such as image resolution as the flight conditions change. Typically, the images are digitally encoded for transmission and transmitted by a microwave transmitter to a tracking antenna where the received signal is synchronized and decoded. In some cases the digitally encoded video signals are encrypted before transmission and then decrypted when received. Clearly, the encoder on the aircraft and the decoder at the receiver must be synchronized (i.e., have the same settings) in order to be compatible. If camera resolution is changed, for example, the encoder setting is changed, thereby requiring that the decoder setting be changed. Often, the decoder is at an unmanned location, thereby rendering decoder adjustment inconvenient, if not impossible. Even where personnel are present at the decoder, two people at different locations are required to effect the necessary changes at the encoder and decoder. These people must be in voice contact which, under some circumstances, is not feasible.

In addition to video parameter changes from a single camera, multiple cameras may provide transmitted video signals to the same receiver operated in a manner to selectively receive those signals. Systems using such multiple cameras might be, for example, aircraft surveillance systems, road traffic monitoring systems, etc. The cameras may have different coded video signal formats and parameters, and may transmit their digital video signals over substantially any transmission medium (e.g., microwave, telephone line, fiber optic systems, etc.), thereby requiring the decoder at the receiver to be adjusted for each of the received signals. Automatic decoder operation is virtually impossible without highly complex and space-consuming equipment.

It is desirable to provide a video image transmission system wherein the decoder at a receiver automatically adapts to each received digital video signal irrespective of the video signal format and parameters, the type of transmission medium and the transmission bit rate.

SUMMARY OF THE INVENTION

In accordance with the present invention the digital video parameters and operational commands are encoded inband with the digital video serial data stream. The decoder at the receiving end of the transmission link is thus able to automatically adjust itself to the transmitting encoder parameters and thereby properly receive and decode the video signal. Each block of data (e.g., an entire image frame or a predetermined portion of a frame such as one or more lines of pixels) includes: a unique start code; system data representing video parameters and commands; system control signals identifying the nature of the system data; digital video data in the form of a variable number of data words, which number depends on the video format and coding arrangement being utilized; a stop code; and an idle code of alternating binary levels between the stop code and the next start code.

Under the control of the system data transmitted with the video data, the receiver decoder is able to configure and reconfigure itself to adapt to the encoder setting at the transmitter of the currently received signal. Thus, whether the digital video signal is raw video, compressed video or any other coded video, this fact is announced to the decoder in the system data. Likewise, parameters such as digital quantization level Q, frame crop settings, interlacing of frames, variations from video standards, resolution, etc., can be indicated by the system data in the successive transmitted lines.

The present invention permits use of worldwide standard as well as non-standard video signals at variable resolutions and frame rates, and allows for transmission link operation at any bandwidth without user intervention. The decoder accepts variable length video images at variable frame rates and resolutions and recreates viewable video images in the selected output format. The method of video data formatting is merely incidental to overall system operation controlled by the embedded system data.

In a typical application, the transmission link type and bandwidth are initially selected by the user. The video source is typically a camera which may provide a standard NTSC (National Television Standards Committee) composite video camera. The encoder system first digitizes the video field comprising 240 vertical lines and 560 horizontal pixels in the NTSC format. This data is then written to a field storage memory in either compressed or raw data format, and the data is then transmitted to the receiver decoder at the selected bit rate. While the current image is being transmitted, the front end digitizing hardware continues to process image data. If the current image field is still being transmitted, the newly digitized field is held in a temporary buffer until transmission of the current field is completed. If the current field is not completely transmitted when a newer field is completely processed, the newer field replaces the data in the temporary field storage, thus guaranteeing that, when the temporary field is transferred to the output buffer, that field is the most recently captured image.

The above and still further objects, features and advantages of the present invention will become apparent upon consideration of the following detailed description of a specific embodiment thereof, particularly when considered in conjunction with the accompanying drawings wherein like reference numerals in the various figures are utilized to designate like components.

DESCRIPTION OF THE PREFERRED EMBODIMENTS

Figure 1:
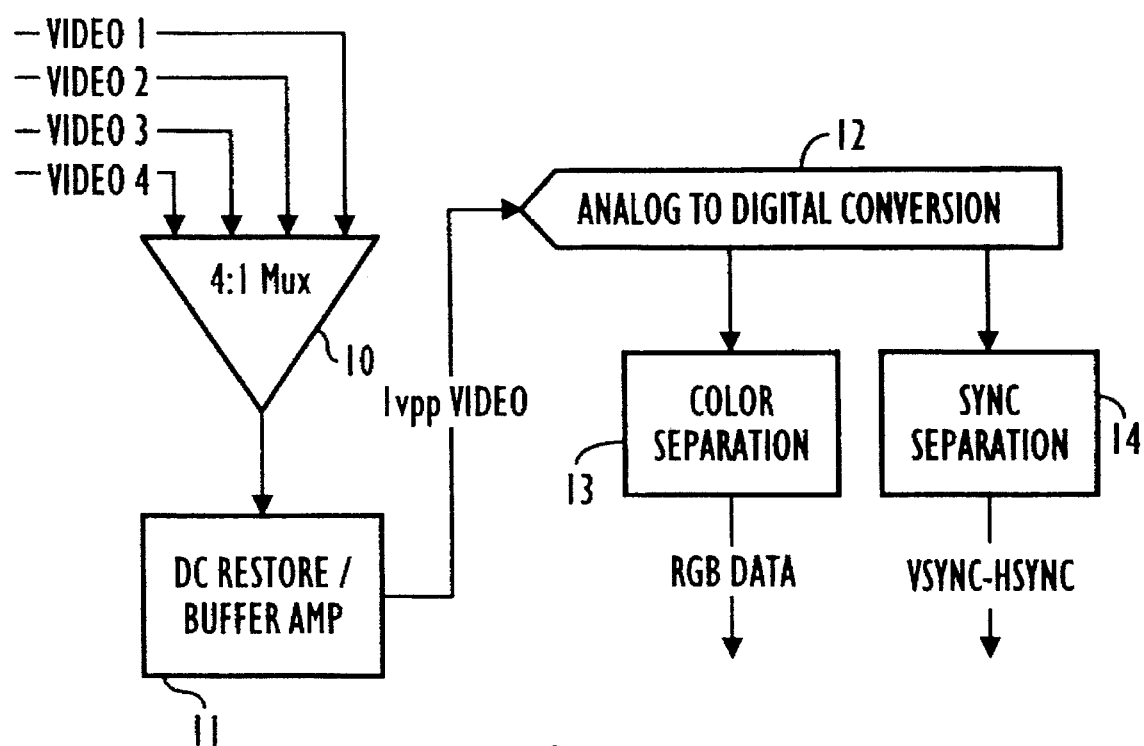
FIG. 1 is a functional block diagram of the video digitization portion of a video transmitting station in the system of the present invention.
Figure 2:
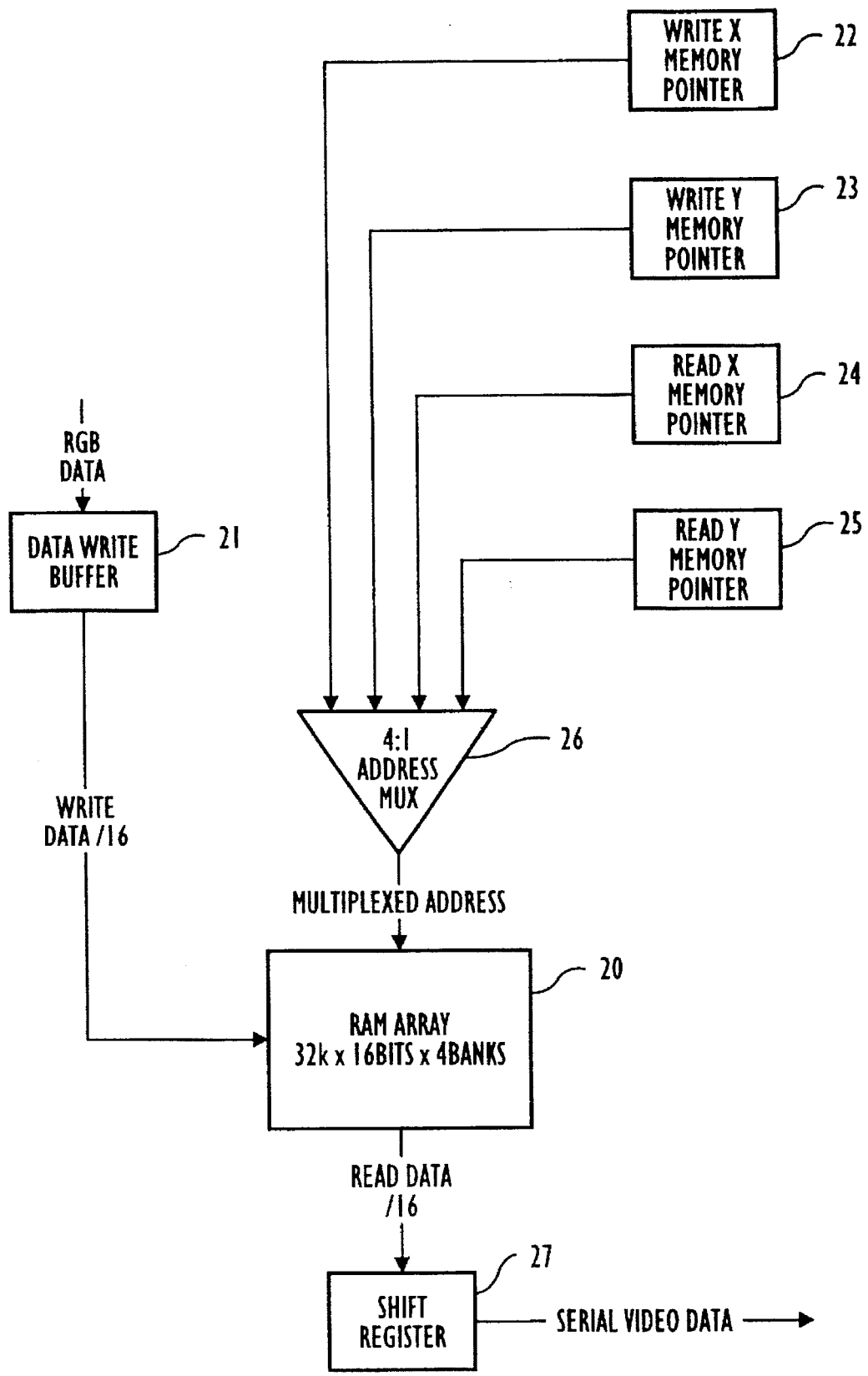
FIG. 2 is a functional block diagram of the memory controller portion of a video transmitting station in the system of the present invention.
Figure 3:
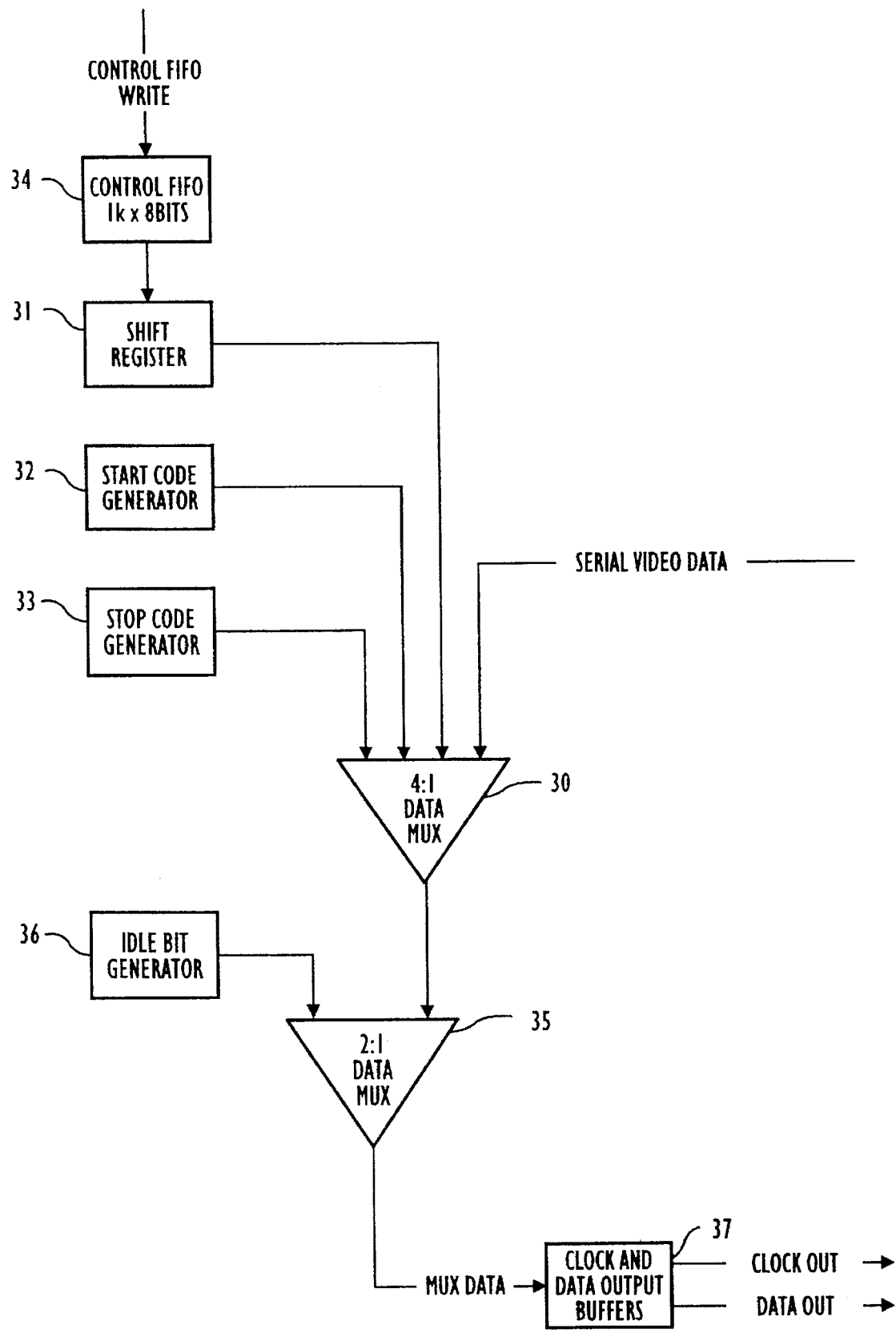
FIG. 3 is a functional block diagram of the serial data formatter and controller portion of the system of the present invention.

Referring specifically to FIGS. 1–3 of the accompanying drawings, there is illustrated an arrangement for encoding a digitized video signal in accordance with the present invention. It is to be understood that the functional components illustrated in FIGS. 1–3 operate under the control of a microprocessor that is not illustrated in order to simplify the drawings and the following description; operation of the microprocessor is illustrated in the flowcharts provided in FIGS. 4–7 and is described in detail below.

A plurality of different raw video input lines are connected to a multiplexer 10, four video input lines being shown in FIG. 1, but it is understood that the principles of the invention apply to any number of such lines. The different raw video signals are typically derived from respective different sources (e.g., cameras, recorded video media, etc.) that may have different video formats or standards. A multiplexer 10, under the control of the microprocessor, selects one of the video signals for encoding and transmission. The selected video signal is a.c. coupled to a conventional d.c. restore circuit 11 having an automatic gain control function. Circuit 11 clamps the base of the synchronization (sync) component of the video signal to zero volts d.c. to permit proper automatic gain control operation. The automatic gain control adjusts the video signal amplitude so that the video signal is one volt referenced to system ground. Once the signal is d.c. restored and gain corrected, it is buffered in circuit 11 and applied to an analog to digital converter 12. Analog to digital converter 12 provides an eight-bit digital output signal numerically representing the selected composite analog video input signal. The digitized video signal is applied to conventional color separation circuit 13 and sync signal separation circuit 14. Color separation circuit 13 derives color separations with, for example, a conventional digital signal processor providing temperature independent tint control and digitally controlled gain parameters. Once all of the necessary signals are generated, they are combined in a twenty-four bit signal (RGB data) representative of the color signal. These twenty-four bits are three bytes of eight bits each corresponding, respectively, to red, green and blue color separations. These bits are synchronized with the pixel clock in a conventional manner and applied to the memory controller circuitry illustrated in FIG. 2.

The memory controller circuit functions to store the digitized video data in a circular four quadrant memory array 20 via a data write buffer 21. The first video data field of pixels is written into the first memory quadrant or bank, the second field is written into the second bank, the third field in to the third bank, the fourth field in to the fourth bank, the fifth field in to the first bank, and so on, in sequence. A video data field typically comprises a frame of video which, for the standard NTSC format, consists of two hundred forty lines, each line including five hundred sixty pixels. The data write buffer 21 is controlled by the microprocessor as are the write X memory pointer 22, the write Y memory pointer 23, the read X memory pointer 24 and the read Y memory pointer 25. These pointers serve to address memory 20, and their output signals are individually selected under microprocessor control by an address multiplexer 26.

In the manner described in detail below, data is read from the banks of memory 20 in 180° phase relation to the data being written into the memory banks. This is done in order to prevent the individual bank buffers within the memory from overlapping. In other words, if the system transmission bit rate is very low, thereby requiring a long time to read data from a bank (e.g., the first bank), the write pointer circuits overwrite the bank that is 180° separated from the bank being read. Thus, while data is being read from the first bank, data would be written into the third bank. As a result, the system is prevented from re-displaying video images that are out of time sequence. Video is read in sixteen bit words from memory 20 and received in a shift register 27 from which the video data is transmitted as part of a unique data block arranged in accordance with the present invention.

The serial video data from shift register 27 is applied to a four channel multiplexer 30 (FIG. 3) along with output signals from a control shift register 31, a start code generator 32 and a stop code generator 33, all controlled by the microprocessor in a manner described in detail below. Control shift register 31 receives digital control signals from a control Fifo (first in, first out) register 34 which, in turn, receives control Fifo write information from the microprocessor. The output signal from multiplexer 30 is selected by the microprocessor and applied to a two-channel multiplexer 35 along with the output signal from an idle bit generator 36. Under microprocessor control, multiplexer 35 passes the selected signals to clock and data buffers 37 arranged to provide the clock and data output signals for transmission to a remote location.

The control shift register 31, start code generator 32, stop code generator 33 and idle bit generator 36 are combined (in the manner described below) with groups of sixteen bit video data words to form a unique serially transmitted data block. This data block is capable of automatically controlling operation of a decoder at a remote receiver. Specifically, the data block includes a start code that uniquely identifies the beginning of a data block being transmitted. The start code is followed by embedded system data and system control signals. The system data signals represent various system formatting and operational parameters necessary for the receiver decoder to configure itself to the transmitter encoder operating mode and to the video format. The system data signals are preferably individual eight-bit bytes, each byte representing data for a different parameter or format. The system control signal is essentially an address serving to identify the format or parameter represented by a respective system data byte. Stated otherwise, the system control signal identifies the storage location in the receiver decoder memory in which the respective data byte is to be stored. Preferably, the system control signal is provided as individual eight-bit bytes, each byte immediately following the related system data byte (i.e., each system data byte has its parameter or format data identified by the immediately following system control byte). Following the required system data and control bytes, video data is inserted into the block to be transmitted. In the preferred embodiment the video data consists of one or more sixteen bit words derived as the serial video data signal from shift register 27. After the last video data word, a stop code from generator 33 is inserted to identify the end of the transmitted video data. This is followed by a series of idle bits from generator 36. The idle bits, typically alternating binary zeroes and ones, serve to fill the time between the stop code of one transmitted block and the start code of another block. Thus, if a stop code has been transmitted but a new image portion is not ready for transmission, multiple alternations between binary one and binary zero are transmitted. There is no maximum number of idle bit alternations, but at least one binary one and one binary zero must be transmitted.

In the preferred embodiment of the invention, the start code is a thirty-two bit code that does not naturally occur in the data stream. One such code is the hexadecimal number 0194D7BF. This start code is transmitted only once per image or image field portion.

In the preferred embodiment the embedded system data byte can have any value between zero and two hundred fifty-five. Each system data byte is always followed by an identifying system control byte. The first five bits (i.e., bits zero through four) of each such control byte identifies the parameter represented by the immediately preceding system data byte. By way of example, Table I lists the hexadecimal values of the system control byte that correspond to the system data byte functions being identified.

TABLE I

| Hexadecimal | Function |
| --- | --- |
| 0 | Q value - 1 through 255 valid range |
| 1 | Encoder status: |
|   | bits 0,1 are resolution |
|   | bits 2,3 are crop setting |
|   | bit 4: is video input valid? 1=yes |
|   | bit 5: is burst in video valid? 1=yes |
|   | bit 6: is predictor enabled? 1=yes |
|   | bit 7: interlaced operation? 1=yes |
| 2 | video operation mode - 0 through 31 valid range |
| 3 | asynchronous data transfer channel #1 |
| 4 | asynchronous data transfer channel #2 |
| 5 | asynchronous data transfer channel #3 |
| 6 | asynchronous data transfer channel #4 |
| 7 | expansion opcode address (0 default) |
| 8 | non-standard horizontal resolution; lsb |
| 9 | non-standard horizontal resolution; msb |
| A | non-standard vertical resolution; lsb |
| B | non-standard vertical resolution; msb |
| C | horizontal crop/8 |
| D | vertical crop/8 |
| E | video data file type (0=compressed, 1=raw) |
| F | audio control byte |
| 10 | time hours, bcd packed |
| 11 | time minutes, bcd packed |
| 12 | time seconds, bcd packed |
| 13 | time fractions, bcd packed; lsd |
| 14 | time fractions, bcd packed; msd |
| 15 | date: year, bcd packed |
| 16 | date: month, bcd packed |
| 17 | date: day, bcd packed |

Bits five and six of the system control byte are parity bits for the system data and control bytes. Bit seven is the "more" bit and indicates whether or not more system data follows the current system control byte. If bit seven is binary zero, the current system control byte is the last control byte in this data block and is immediately followed by video data. If bit seven is binary one, the next two bytes are system data and control bytes, respectively.

The purpose of the system data and control bytes is to allow the encoder to send all pertinent data and variable information to the decoder at the receiver. The decoder thus receives a copy of the set-up parameters for the transmitting encoder. If a particular byte Is not sent, the receiving decoder uses a predetermined default value. This is required in order that the decoder can operate in a "hands off" environment; that is, the preferred embodiment of the invention enables decoder operation to be completely automatic. The decoder continuously monitors the received parameters from the system data and control bytes, and updates the decoder copy of the encoder parameters. Whenever there is a change in a vital setting, the decoder waits for the change to be received at least two consecutive times (i.e., in two consecutive received data blocks). The use of parity bits in the system control byte rules out any random bit errors. Once the change has been verified, the decoder resets itself to the new configuration.

The required parameters for decoder operation are contained in address values zero, one and two of the system control byte. If the other system control values refer to zero levels in the identified data byte, or are not sent by the encoder, the decoder uses the first three values, namely zero, one and two, for all information. If non-standard values are identified by the control byte, the decoder uses the corresponding values from the system data byte instead of the values identified by control byte values zero, one and two. If time and date are sent, they are utilized; if they are not sent, time and date are set locally within the decoder. If asynchronous data (values three, four, five and six) is identified, the asynchronous data is utilized; otherwise it is ignored. The expansion opcode (value of seven) is for future utilization to expand the total number of opcodes and, for purposes of the disclosed system, is assumed to be zero.

The video data bits are transmitted immediately following the last system control byte. The data may be compressed or uncompressed, color or monochrome, or any desired format. The format is selected by the system data and control bytes. The video data must be one or more sixteen bit words; if it is not, the remainder of the word must be filled with a binary one code to make up a total of sixteen bits. The only invalid patterns for the video data field are the start code and stop code. The minimum size of a data field is sixteen bits and the maximum size is determined by the amount of memory in the system. In the preferred embodiment, the memory includes 524,208 bits per field. There is no limitation on the number of pixels per line or on the number of lines per image transmitted.

In the preferred embodiment the stop code is made up of all binary ones and is twenty-four bits long, corresponding to the hexadecimal value FFFFFF. The stop code marks the end of a complete image and processing does not start again until a start code is located.

As noted above, when the stop code has been transmitted and a new image is not ready, idle codes are generated by the encoder. This consists of repeating a binary zero-binary one alternating pattern which serves to maintain a consistent binary ones density during this idle time.

Figure 4:
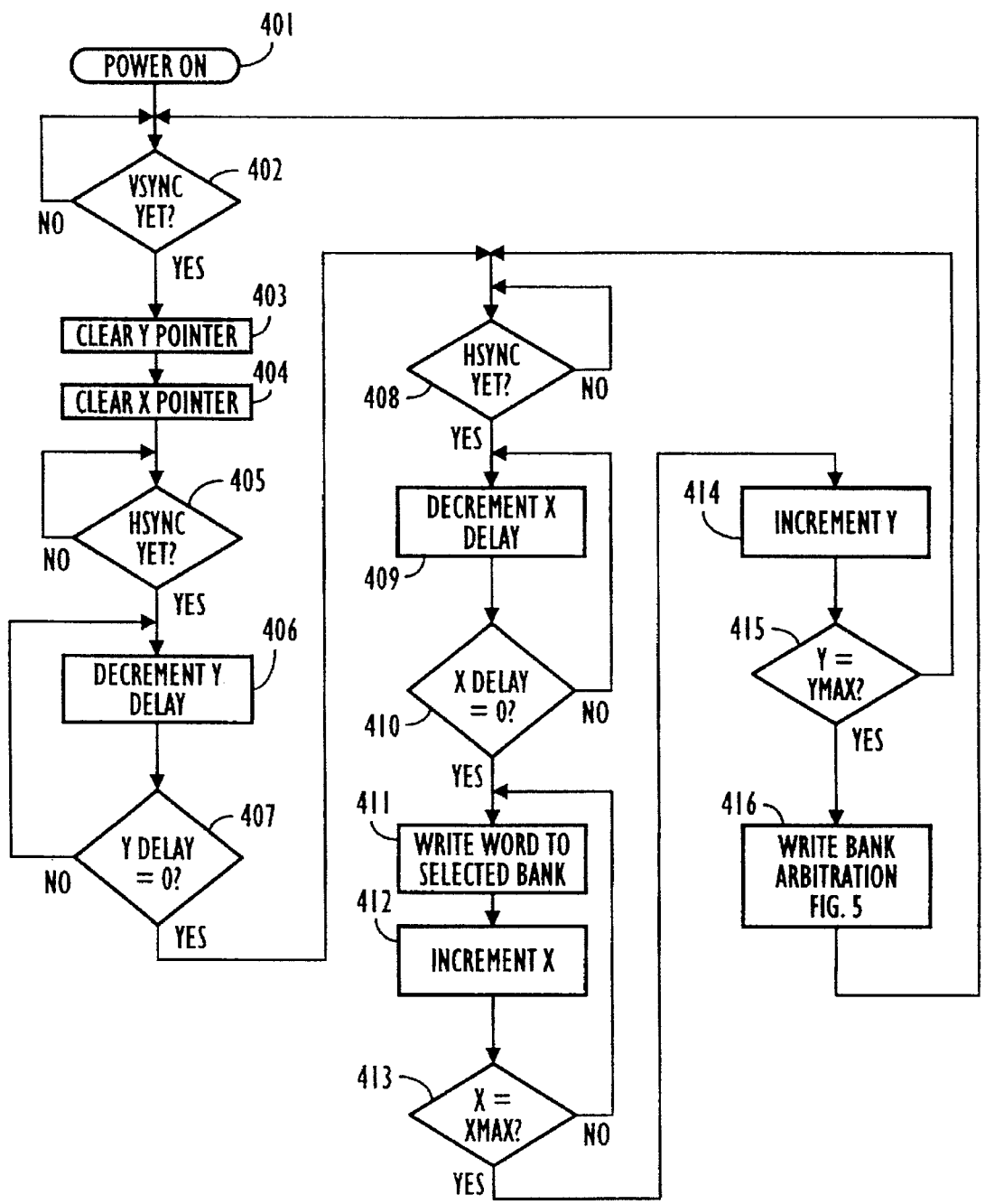
FIG. 4 is a flowchart representing operation of the encoder video data write control function of the present invention.

As also noted above, the system operation, including generation of the unique block of data permitting adaptive decoder operation, is controlled by software in the microprocessor. Control over the encoder video data write function is illustrated in FIG. 4 to which specific reference is now made. After power on initialization (401) the data write control circuitry awaits the first vsync pulse from the sync separator circuit 14 (FIG. 1) for synchronization. Once the vsync pulse is detected (402), the vertical and horizontal memory pointers are cleared (403, 404). The vertical pointer 22 (FIG. 2) addresses the memory array on the Y axis, and the horizontal memory pointer 23 addresses the memory array 20 on the X axis. The controller then awaits the hsync pulse from circuit 14 for horizontal synchronization (405). Once synchronized, the controller counts a specified number of lines before saving digitized data. This functions to either crop the display screen or to bypass blanked video lines at the top of the screen, and is effected by decrementing a pre-settable counter with the hsync (406). Once the Y delay has been counted out (407), an X delay counter is loaded. This is utilized to crop and center the image on the screen and is effected by decrementing a pre-settable counter (409) with each hsync pulse. Once the delay is zero (410), the controller starts writing the video information to the memory array (411) as indexed by the X and Y address. After each write function, an X counter is incremented (412) until it has been determined that a maximum is reached (413), e.g., at the end of a horizontal line. Thereafter, a Y counter is incremented (414) and the write process repeats for the next line until a maximum is reached (415). The write process thus repeats until the maximum programmed address is reached, a situation that occurs when Xmax and Ymax are both true (413, 415). When a field is completely written into a bank of memory, the next bank number is calculated (416).

Figure 5:
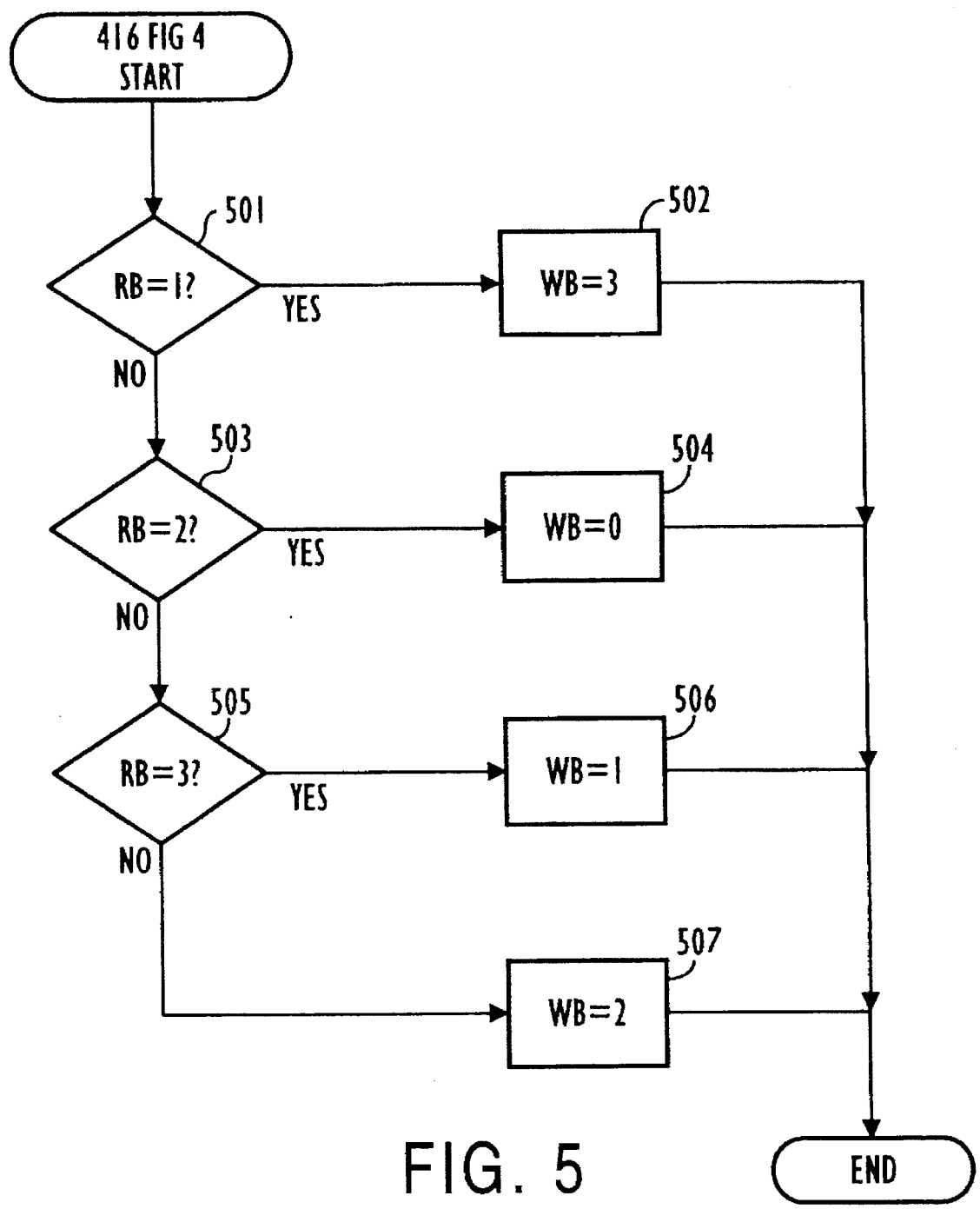
FIG. 5 is a flowchart representing operation of the encoder write bank arbitration function of the present invention.

The write bank controller selects the next bank of memory into which data is to be written. Memory 20 (FIG. 2) is organized as a four quadrant circular buffer. The write pointers 22, 23 have a lower priority than the read pointers 24, 25 in the encoder and use the read pointers for all decision making. The write pointer should always be 180° out of phase with the read pointer. This is accomplished by adding fifty percent of the read bank value to itself and storing to the write bank pointer for the next field. More specifically, (and as illustrated in FIG. 5) if the read pointers are pointed to bank one (501), the write pointers are directed to point to bank three (502). If the read pointers are pointed to memory bank two (503), the write pointers are directed to bank zero (504). If the read pointers are pointed to bank three (505), the write pointers are directed to memory bank one (506). If the read pointers are pointed to neither of banks one, two or three (501, 502, 503), the write pointers are directed to memory bank two (507).

Figure 6:
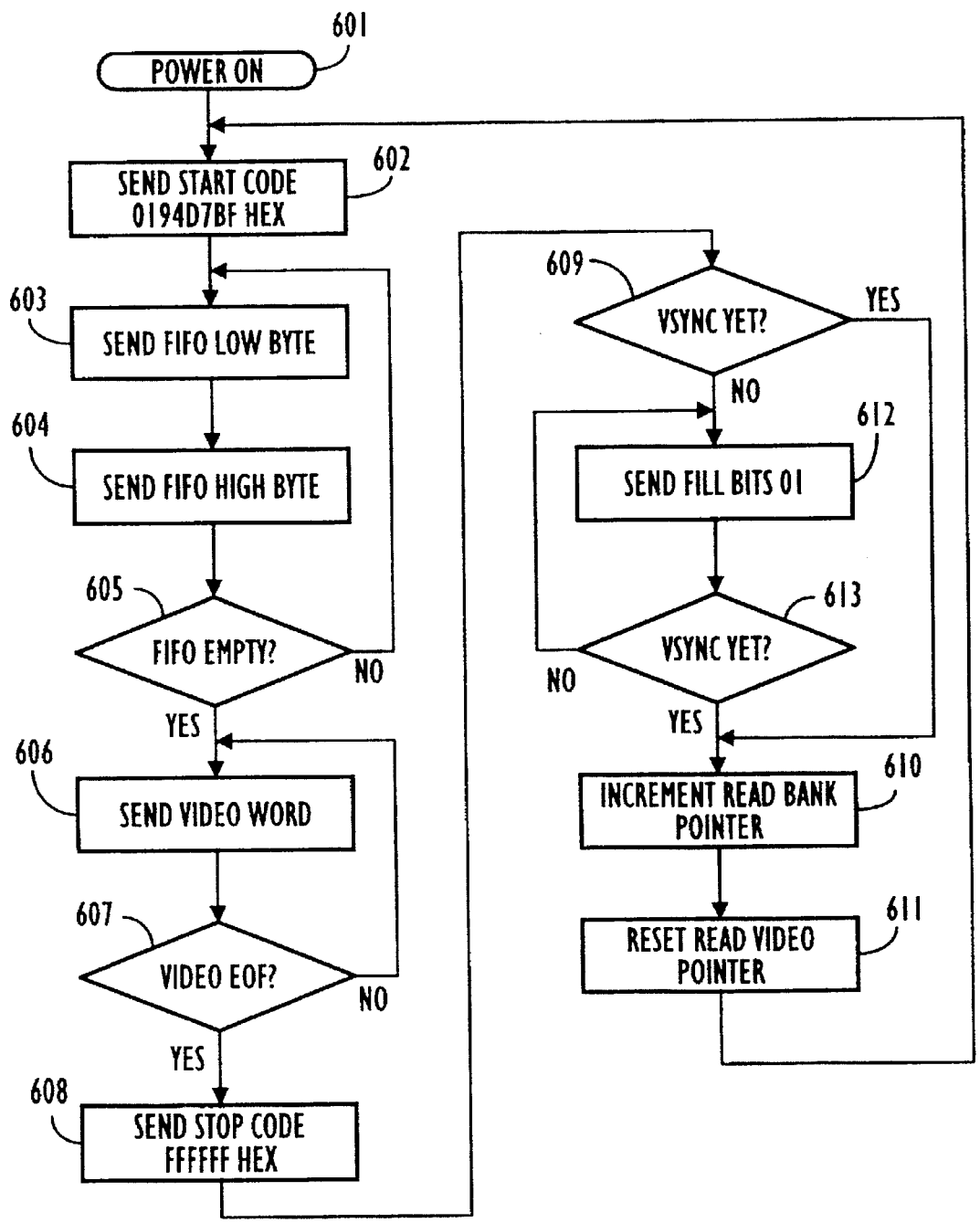
FIG. 6 is a flowchart representing operation of the transmit data sequencer function of the present invention.

Control over transmission of the unique data block is illustrated in FIG. 6. After power on initialization (601), the encoder transmits the thirty-two bit start code (602). After the start code, the control channel Fifo system data (603) and address or system control (604) bytes are transmitted with the system data byte preceding the system control byte. This is repeated until the control channel Fifo is empty (605). The control channel Fifo is filled by the system control processor every vsync period. Any number of bytes may be written, but two bytes is the minimum necessary for proper operation. The number of bytes needed to be transmitted is determined by the number of non-default parameters being utilized. If the encoder is always in the default mode, no parameters need to be sent, but at a minimum system data bytes zero, one and two and their accompanying control bytes should be transmitted. Bytes three through seventeen need to be sent if they are changed from the default values. The decoder uses the default value if a parameter is not transmitted by the encoder. After the system data and control bytes have been transmitted, the first video word of sixteen bytes is transmitted (606). The video image is presented in multiples of sixteen bit words. Following each video data word transmission, a determination is made as to whether or not the end of the video data field has been reached (607). If not, an additional data word is transmitted; if so, the stop code is transmitted (608). The video image must be padded with binary ones if the length is an uneven multiple prior to serial transmission.

After the stop code is transmitted, vsync status is checked (609). If vsync has occurred since the last time it was checked, the process repeats immediately by incrementing the read bank pointers (610) and resetting the read video pointers (611). If the vsync has not yet occurred, an alternating pattern of zeros and ones is sent (612) until the vsync occurs (613), at which time the process repeats once again.

Figure 7:
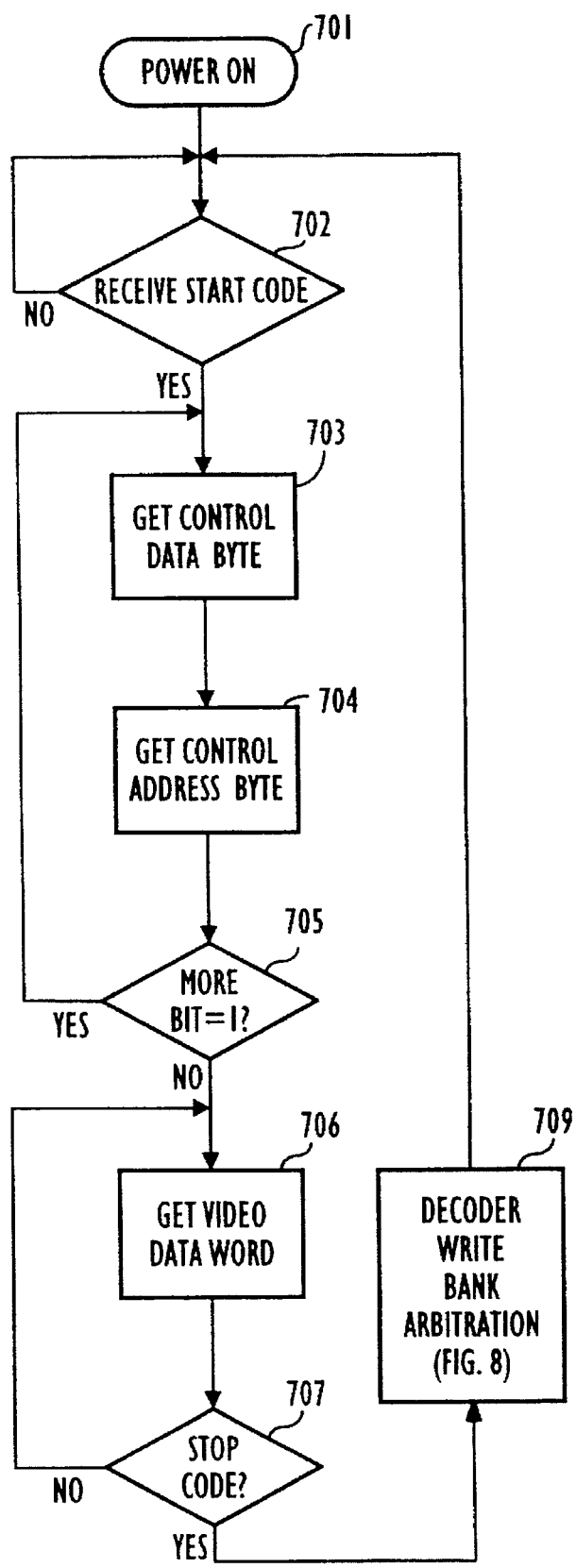
FIG. 7 is a flowchart representing operation of the decoder receive sequencer function of the present invention.

At the receiving end of the transmission medium, the receiver decoder takes the unique digital video data stream blocks and converts them back to an NTSC analog composite video signal. Referring to FIG. 7, after the initial power on sequence (701), the decoder awaits reception of the thirty-two bit start code from the transmitter encoder (702). All other data patterns are ignored until this code is received. Once the start code has been received, the decoder is synchronized with the incoming data stream. All data is in sixteen bit multiples until the stop code is encountered. Following the start code, the next two bytes received are the system data (703) and system control (704) bytes. The system data byte is written to the decoder memory address pointed to by the system control byte after the checksum bits have been verified. If the "more" bit in the control byte is set (705), the process repeats. Control data bytes continue to be received until the "more" bit is equal to zero.

Immediately following the last control byte, video data words are received (706) in multiples of sixteen bits. These words are written sequentially starting from address zero in the selected bank of the memory. The video data is written until the stop code is encountered. When the stop code appears, the video address pointer is set to zero and the next write bank is calculated (709). The sequencer then awaits the next start code for the process to repeat itself.

Figure 8:
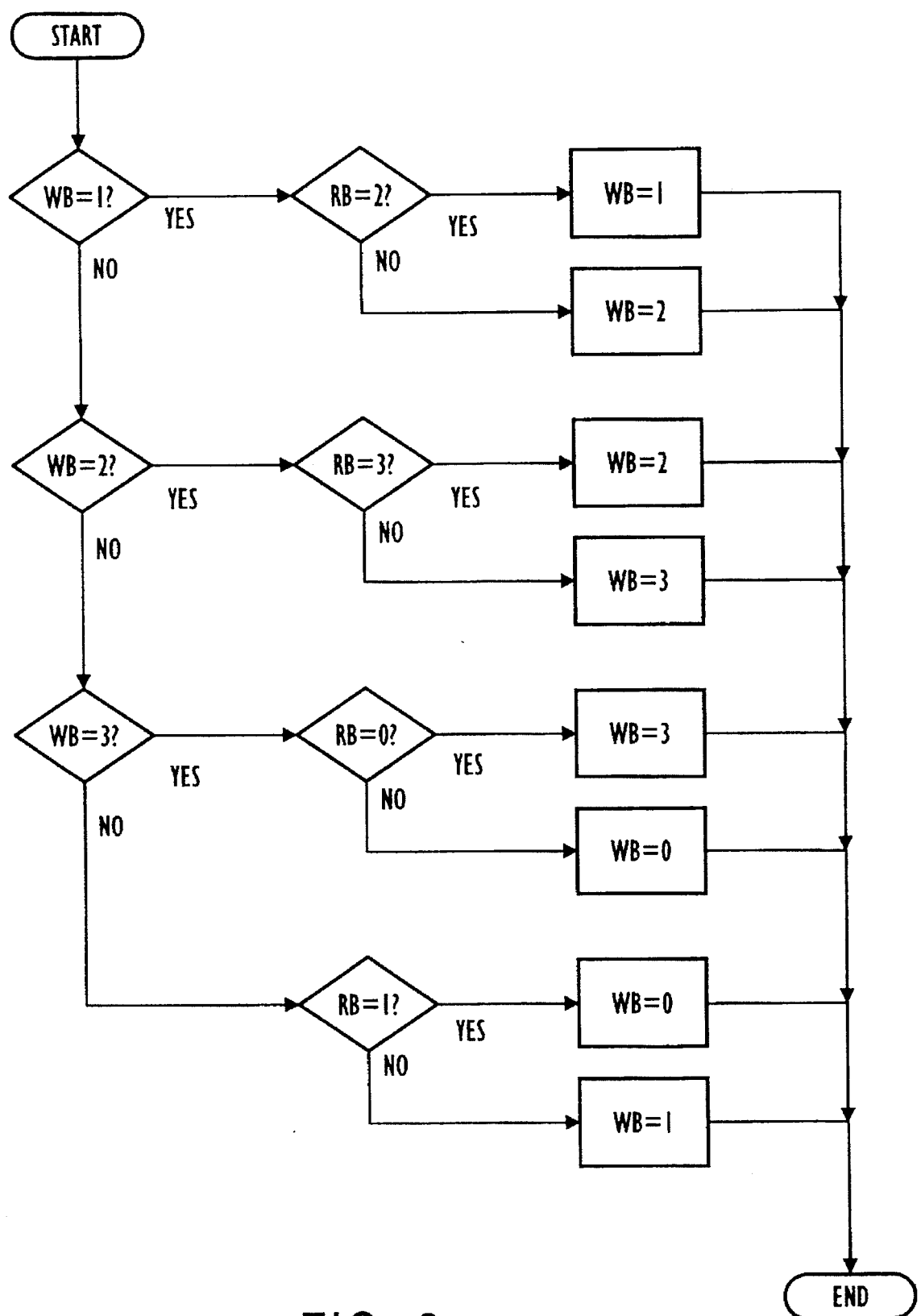
FIG. 8 is a flowchart representing operation of the decoder write arbitration function of the present invention.

The write bank arbitration for the decoder is decided with a write priority arrangement as illustrated in FIG. 8. In this regard, FIG. 8 is self-explanatory and need not be described in detail. The important aspect here is that the write pointer tries to stay 90° behind the read pointer. If the next bank is less than 90° behind the read pointer, a potential exists for a collision. In such a case the write pointer would not be incremented and the last bank that was written into would be written over. This is an error condition that is sought to be avoided by the process illustrated in FIG. 8. Normally, the write pointer is more than 90° away, and it is incremented by an additional 90°.

Figure 9:
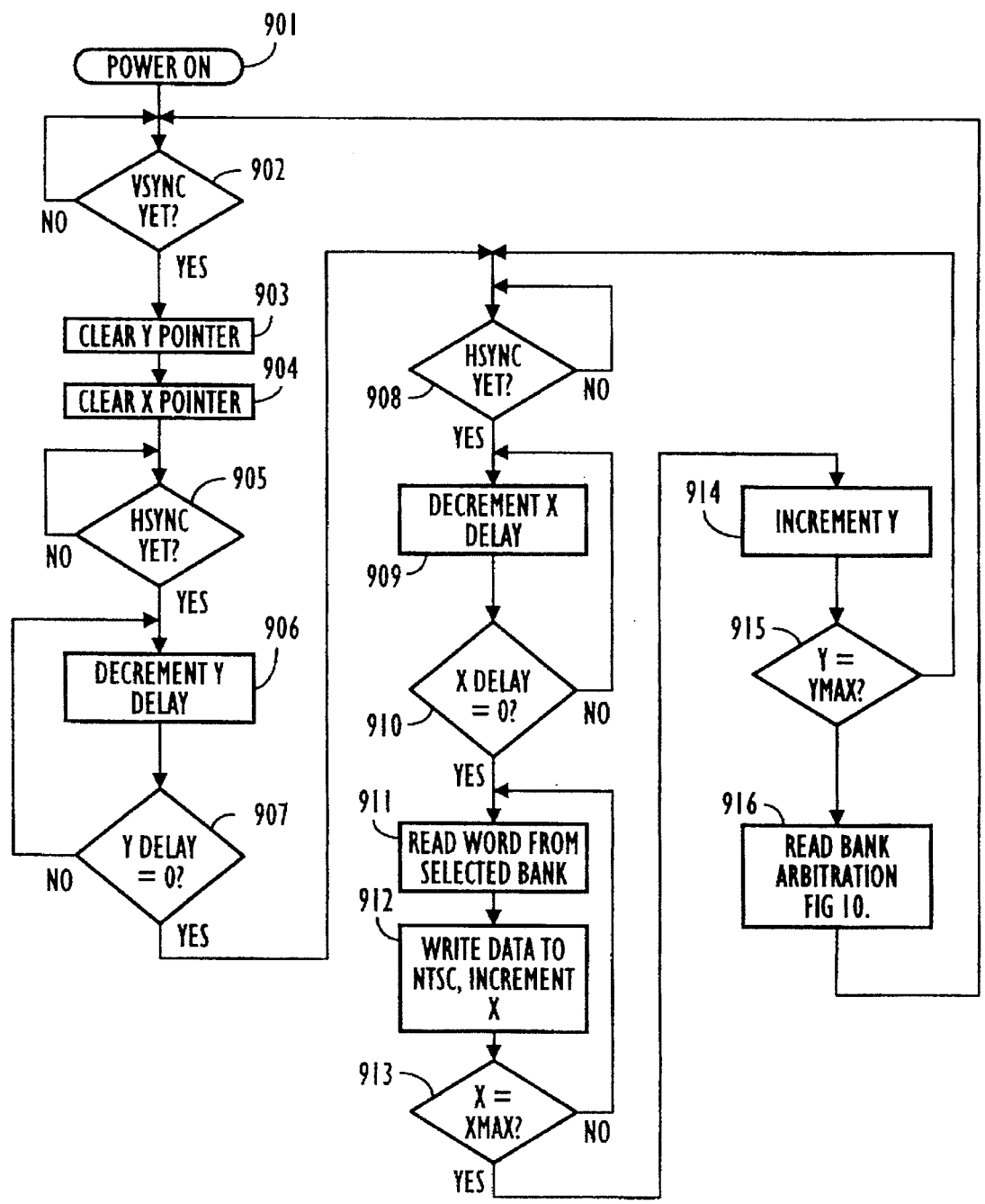
FIG. 9 is a flowchart representing operation of the decoder video write control function of the present invention.

The procedure for reading the received data from the four bank decoder memory and writing it into the NTSC format memory is illustrated in FIG. 9. After power on initialization (901), the decoder data logic awaits the first internally generated vsync (902) in order to begin operation. Once the vsync has occurred, the X and Y pointers are set to zero (903, 904). There is then a vertical delay of n hsync periods (905, 906) to vertically align the image and to match the cropping values set in the transmitter encoder. Upon the starting video line being reached (907), a horizontal delay counter is set (908, 909) to align the image horizontally and to match the cropping value set in the encoder. After the horizontal delay has expired (910), the stored video data word is read from the selected decoder memory bank (911). This word is written into the NTSC format memory (912). The process is repeated until the maximum X and Y values are reached (913, 914, 915). Once this has occurred a new read bank is calculated (916) and the controller waits for the next vsync (902) to start the process again.

Figure 10:
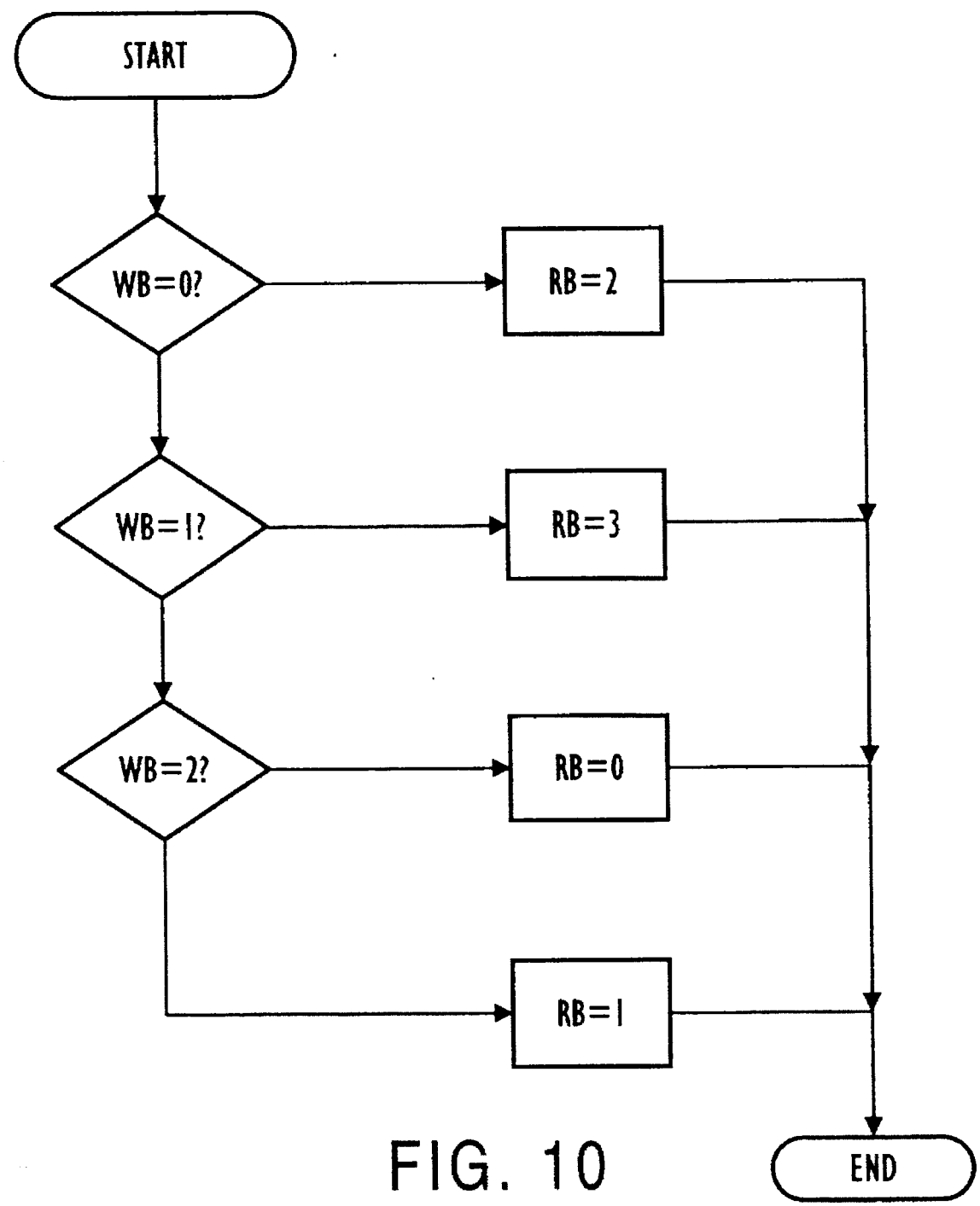
FIG. 10 is a flowchart representing operation of the decoder read arbitration function of the present invention.

The decoder read bank arbitration logic (FIG. 10) tries to maintain the decoder read pointer 180° away from the write pointer. This provides a margin of error and keeps pointer collisions from occurring. This process is directly analogous to that described and illustrated in relation to FIG. 5 and is not repeated here.

In the exemplary embodiment described above, the transmission medium was assumed to be copper wire and the bandwidth assumed to be one MHz. The video source was assumed to be a standard NTSC composite video camera. As described, the encoder first digitizes the NTSC field of video comprising 240 vertical lines and 560 horizontal pixels. The data is then written into a field storage memory in either compressed or raw data format. The digitized data is then transmitted to the decoder at the other end of the transmission medium at the one MHz bit rate. While the present image is being transmitted, the front end digitizing hardware still processes data. If the current image is still being transmitted, the newly digitized field is held in a temporary buffer until the current field is completed. If the current field is not complete and a newer field is processed, the newer field replaces the data in the temporary field of storage. This guarantees that when the temporary field is transferred to the output buffer, it is the most recently captured image.

In an actual embodiment of the present invention, the entire encoder is housed in a twenty nine cubic inch unit containing all of the hardware including the case, power supply and connectors. This is approximately one percent of the current size of conventional teleconferencing equipment.

Because of the adaptive nature of the system, it is much easier to provide interface with existing equipment. This is due to the synchronous nature of the memory arrays. The encoder is bit rate independent; that is, it will automatically adapt to any bit rate frequency selected. This feature also permits the use of asymmetrical clocks and missing clock schemes. The system functions with microwave, fiber and telecommunication links of all types.

Although the preferred embodiment has been disclosed as restoring at the receiver decoder a video signal having the same format (e.g., NTSC) as the original signal encoded at the transmitter, it will be appreciated that the inband coding technique makes it possible to convert the signal, as decoded, to a different standard.

Since the system does not utilize the differencing of adjacent video frames or motion estimation, the amount of hardware required is greatly reduced. The result is a smaller, lighter and lower power encoder.

The decoder is basically the inverse of the encoder block diagram, and therefore is not illustrated in detail. The key feature, of course, is the automatic set-up of the parameters at the decoder. This allows the decoder to automatically adjust to any encoder parameter settings. In actual use this feature saves the operator from changing both the encoder and decoder to the same settings. Even though this may sound simple, the system fails if the parameters are not the same. Typical applications place the encoder and decoder miles apart, thereby requiring two people to make changes. It is also necessary that the personnel be in voice contact which may not necessarily be available. With the automatic parameter loading feature of the present invention, the decoder cannot be improperly configured. Only the encoder is changed to whatever settings are required, thereby making utilization of the system both simple and convenient.

As previously noted, the system has particular application for air surveillance systems, traffic surveillance systems, and the like.

From the foregoing description it will be appreciated that the invention makes available a novel adaptive digital video system wherein remote decoders are able to configure themselves automatically to the transmitting encoder settings to receive digital video formats of substantially any type on substantially any transmission medium.

Having described a preferred embodiment of a new and improved adaptive digital video system in accordance with the present invention, it is believed that other modifications, variations and changes will be suggested to persons skilled in the art in view of the teachings set forth herein. Accordingly, it is to be understood that all such variations, modifications and changes are believed to fall within the scope of the present invention as broadly construed by the appended claims.

What is claimed is:

1. A method of transmitting and receiving digital video image signals comprising the steps of:
   (a) transmitting from at least one transmitting station video images, each image comprising a series of successively transmitted blocks of digitized information encoded in a predetermined format based on parameters of said images, wherein transmission of each block includes the steps of:
      (a.1) transmitting a start code identifying the start of the transmitted block;
      (a.2) transmitting a stop code spaced in time from the transmitted start code and identifying the end of the transmitted block;
      (a.3) transmitting a plurality of successive video data words constituting digitally coded video information in an image signal;
      (a.4) transmitting system data signals representing parameters of the video data words and system commands required at the receiving station to decode the encoded video data words, wherein the system data signal in successively transmitted blocks represent different video data parameters or system commands; and
      (a.5) transmitting system control information signals identifying, in each transmitted block, the parameter or command represented by system data signals in that transmitted block;
      wherein steps (a.3), (a.4) and (a.5) are positioned in time intermediate steps (a.1) and (a.2);
   (b) receiving the transmitted blocks at a location remote from said transmitting station; and
   (c) decoding the encoded video data words in the received blocks to reproduce said video images in an original state prior to said encoding in accordance with the parameters and commands represented by the system data signals in said received blocks and identified by the system control information in said received blocks;
   wherein step (a) is characterized by said predetermined format and said parameters being selectively alterable to vary said encoding; and
   step (c) is characterized by automatically adjusting said decoding in response to altering said format and parameters to accommodate the varied encoding of said video images.

2. The method of claim 1 further comprising the step of:
   (a.6) transmitting a series of idle bits following transmission of the stop code in step (a.2) and preceding transmission of the next start code to thereby identify idle time between transmission of successive transmitted blocks.

3. The method of claim 2 wherein step (a.5) includes identifying the parameter represented in at least some of said transmitted data blocks as the quantization level of the digitally coded video information contained in video data words transmitted in step (a.3), wherein step (a.5) also includes identifying the parameter represented in at least some of said transmitted data blocks as image resolution and frame crop setting for video images comprised of the video information in said series of transmitted blocks, and wherein step (a.5) also includes identifying the parameter represented in at least some of the transmitted data blocks as the video operating mode for the video source of the video image signals being transmitted.

4. The method of claim 2 wherein step (a.6) includes transmitting said series of idle bits as alternating binary levels.

5. The method of claim 1 wherein step (a.4) comprises transmitting a plurality of system data bytes as part of each transmitted block, each of said plurality of system data bytes representing a different respective video data parameter or system command; and wherein step (a.5) comprises transmitting a plurality of system control bytes as part of each transmitted block, each of said plurality of system control bytes identifying the video data parameter or system command in a respective system data byte transmitted in step (a.4).

6. The method of claim 5 further comprising the step of transmitting said plurality of system data bytes in an alternating sequence with said plurality of system control bytes.

7. The method of claim 6 wherein step (a.5) includes transmitting as part of each system control byte at least one bit indicating whether the next transmitted byte is another transmitted system data or control byte or part of a video data word.

8. The method of claim 5 wherein step (a.3) comprises transmitting in each block multiple digital words representing an entire video image having multiple lines of pixels.

9. The method of claim 1 wherein step (a.5) includes identifying the parameter represented in at least some of said transmitted data blocks as the quantization level of the digitally coded video information contained in video data words transmitted in step (a.3), wherein step (a.5) also includes identifying the parameter represented in at least some of said transmitted data blocks as image resolution and frame crop setting for video images comprised of the video information in said series of transmitted blocks, and wherein step (a.5) also includes identifying the parameter represented in at least some of the transmitted data blocks as the video operating mode for the video source of the video image signals being transmitted.

10. The method of transmitting and receiving digitized video signals comprising the steps of:

(a) deriving a video image with known parameters;

(b) encoding said video image in a predetermined digital format based on said parameters of said image;

(c) transmitting the encoded video image as multiple successively transmitted digital signal blocks, each block including a respective portion of the video image;

(d) inserting into each of said transmitted signal blocks a start code identifying the start of the block, a stop code identifying the end of the block, digitally coded system information indicative of said predetermined format and known parameters, and digital video data words representing said respective portions of the video image;

(e) receiving the transmitted signal blocks; and (f) decoding the encoded video image from the received signal blocks to reproduce the video image in an original state prior to said encoding as a function of the digitally coded system information in the received signal blocks;

wherein steps (a) and (d) are characterized by said predetermined format and said parameters being selectively alterable to vary said encoding; and step (c) is characterized by automatically adjusting said decoding in response to altering said format and parameters to accommodate the varied encoding of said video images.

11. The method of claim 10 wherein step (d) includes forming said digitally coded system information as bytes of system data alternating with bytes of system control information, wherein the bytes of system data represent respective video image parameters and coding format information, and wherein the bytes of said control information identify the particular video information parameter and coding represented by respective bytes of system data.

12. The method of claim 11 further comprising the step of transmitting a series of idle bits following transmission of the stop code and preceding the transmission of the next start code to identify idle time between transmission of successive transmitted blocks.

13. The method of claim 11 wherein step (d) includes said bytes of system control information with at least one bit indicating whether the next transmitted byte is another transmitted system data byte or a portion of the video image.

14. The method of transmitting and receiving digitized video signals comprising the steps of:

(a) deriving a plurality of video image signals with known parameters at a respective plurality of spaced transmitting stations, wherein the known parameters of at least some of said plurality of signals differ from the known parameters of others of said signals;

(b) encoding said video image signals in a predetermined digital format at each transmitting station, wherein the formats of at least some of the video images differ from the formats of others of said video images;

(c) transmitting the encoded video image signals as multiple successively transmitted digital signal blocks from each transmitting station, each block including a respective video image;

(d) inserting into each of said transmitted signal blocks a start code identifying the start of the block, a stop code identifying the end of the block, digitally coded system information indicative of said predetermined format and known parameters, and digital video data words representing said respective portions of the transmitted video image;

(e) receiving at a common receiver the transmitted signal blocks from said transmitting stations selectively; and (f) decoding at a common decoder the encoded video image from the received signal blocks to reproduce the video image in an original state prior to said encoding as a function of the digitally coded system information in the received signal blocks;

whereby encoded video images of different known parameters and formats are received and automatically decoded without requiring manual adjustment of decoding equipment.

15. The method of claim 14 wherein step (d) includes forming said digitally coded system information as bytes of system data alternating with bytes of system control information, wherein the bytes of system data represent respective video image parameters and coding format information, and wherein the bytes of said control information identify the particular video information parameter and coding represented by respective bytes of system data.

16. The method of claim 15 further comprising the step of transmitting a series of idle bits following transmission of the stop code and preceding the transmission of the next start code to identify idle time between transmission of successive transmitted blocks.

17. The method of claim 15 wherein step (d) includes said bytes of system control information with at least one bit indicating whether the next transmitted byte is another transmitted system data byte or a portion of the video image.

* * * * *